(No Model.)
P. A. SPICER.
ANIMAL POKE.
No. 366,983. Patented July 19, 1887.
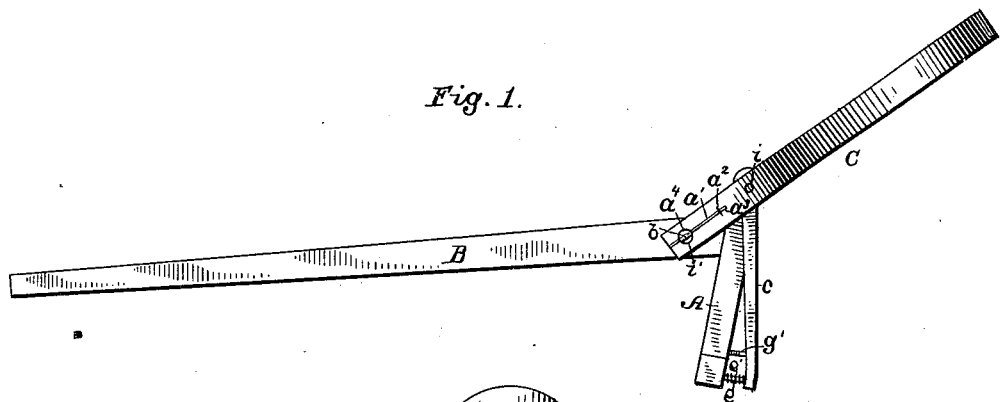
Fig. 1.
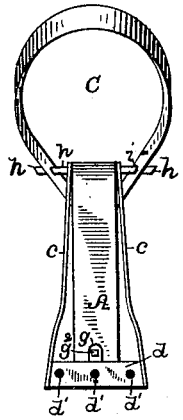
Fig. 3.
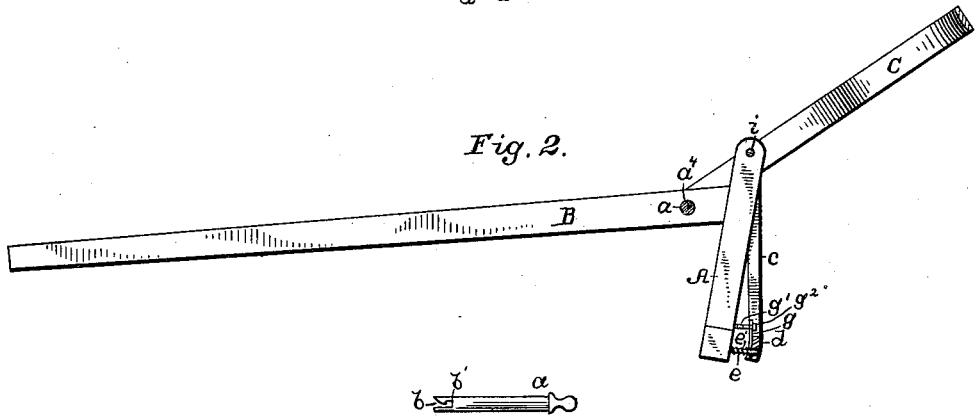
Fig. 2.
Fig. 4.
Witnesses
F. J. Fischer
W. L. Boyden
Inventor
Pratt A. Spicer
By his Attorney in fact
Chas. E. Barber

UNITED STATES PATENT OFFICE.

PRATT A. SPICER, OF MARSHALL, MICHIGAN.

ANIMAL-POKE.

SPECIFICATION forming part of Letters Patent No. 366,983, dated July 19, 1887.

Application filed March 15, 1887. Serial No. 230,998. (No model.)

*To all whom it may concern:*

Be it known that I, PRATT A. SPICER, a citizen of the United States, residing at Marshall, in the county of Calhoun, State of Michigan, have invented certain new and useful Improvements in Animal-Pokes, of which the following is so full, clear, and exact a description as will enable others skilled in the art to which my invention appertains to make and use the same, reference being had to the accompanying drawings, in which—

Figure 1 is a side view of my improved animal-poke. Fig. 2 is a longitudinal section of the same. Fig. 3 is a rear view of the poke. Fig. 4 is a detail view of the bolt which holds the bow to the head-block.

The object of my invention is to construct a poke of light weight which shall be sufficiently strong and effective to prevent an animal from jumping over any lawful or ordinary fence, and at the same time to construct a poke which will not be a serious inconvenience to the animal in feeding, and one which will not be liable to injure the animal in any way.

Another object of my invention is to construct a poke which will prick and frighten an animal as he goes to jump, and thus discourage him from attempting to make the leap, thus lessening liability to injury from making a bad jump with the poke, and serve at the same time as an additional means to prevent the animal from jumping at all.

The invention consists in the construction and combination of parts, as will be hereinafter fully described, and particularly pointed out in the claims at the end of the specification.

In the accompanying drawings, the head-block A is rigidly secured to the stale B, and both are rigidly secured, when in an operative position, to the yoke or bow C. The stale is perforated at $a$, and the bow is provided with a spring, $a'$, having a staple, $a^2$, which holds it in place midway between its free end and the end which is secured to the poke at $a^3$. This spring $a'$ acts as a locking-key to hold the bolt $a^4$ in position when the bow is fastened to the poke. The bolt $a^4$ is provided with a recess, $b$, in one end, one side of which has a second recess, $b'$, which extends into the side of the key or bolt at right angles to the slot $b$. The locking key or spring $a'$ is rigidly secured to the poke in such a manner that its own elasticity will always keep it close to the side of the hole $a$ through the poke. Thus it will be seen that the bolt $a^4$ cannot be removed without holding the spring over against the smooth side of the recess $b$, and it will be seen at a glance that it will be practically impossible for an animal to disengage the bow from the poke without assistance. The advantage of this is twofold. In the first place, it will prevent the poke from being lost, and, in the second place, it will lessen the liability of losing or misplacing the key for locking the bolt in position.

At the upper portion of the head-block are pivotally secured two rods, $c\ c$. At the lower ends of these rods is a cross-piece or shield, $d$, provided with perforations $d'\ d'$, through which extend brads or spikes $e$, which are sharpened at their ends and rigidly secured at their base to the head-block. Each of these brads is provided with a coil-spring, $e'$, which springs serve to keep the cross-piece $d$ out in such a position as to protect the animal from the sharp points of the brads $e$, so long as the animal keeps away from the fence. There may also be used additional brads without springs.

To prevent accidental displacement of the cross-piece $d$, the cross-piece $d$ is provided with a lug, $g$, which is perforated and provided with a bolt, $g'$, which has a head, $g^2$, and is screw-threaded at its inner end. This is screwed down until the cross-piece $d$ is at the desired distance from the lower portion of the head-block, and extends down over the brads just far enough to keep the cross-piece in place and at the same time extend slightly beyond the outward limit of the points of the brads in the lower end of the head-block; or a staple may be used instead. The upper end of the head-block is provided with a projecting pin or lug, $h$, which extends each side of the poke, and is adapted to receive the upper perforations, $i$, in the upper portion of the bow C. The bow C is also perforated in its lower portions at each of its bifurcated ends, as shown by the reference-letter $i'$. By this arrangement of devices the animal is effectually frightened away from the fence as soon as he comes near enough to allow the stale to touch the fence, and he is soon discouraged from attempting to jump a fence under any circumstances.

It is quite obvious that two bolts might be extended through the cross-piece which protects the points of the brads and the side pieces. The rods c c might then be dispensed with without departing from the spirit of my invention.

Having now described the uses, advantages, and objects and construction of my invention, what I desire to secure by Letters Patent, and what I therefore claim, is—

1. In an animal-poke of the character described, the combination of a head-block having a stale rigidly secured thereto, and a bow rigidly secured to the head-block and stale, said bow extending down and engaging with the upper end of the head-block and rigidly secured in place at its lower end, substantially as and for the purposes hereinbefore specified.

2. In an animal-poke of the character described, the combination of the head-block having the stale rigidly secured thereto, a bow rigidly secured to the stale and head-block, with a pin or projection at the upper portion of the head-block, which serves the double purpose of holding the bow rigidly in place and as a pivotal bearing for the pivotal rods which support the shield, and the brads and shield therefor, all constructed and combined to operate substantially as and for the purposes specified.

3. In an animal-poke, the combination of the head-block, stale, and bow, said bow being provided with a spring and a perforation, the spring being so secured to the bow that its own elasticity will tend to keep it near one side of the perforation, with a bolt having a notched and slotted end, all constructed and combined to operate substantially as described, whereby the spring will hold the bolt in place in the poke and will be held against the bolt in the bottom of the notch therein, substantially as and for the purposes specified.

4. In an animal-poke of the character described, the combination of the stale, the head-block, and the bow with a bolt having a notched and slotted end, and an elastic locking-key for holding the bolt in position, substantially as and for the purposes specified.

In testimony that I claim the above as my invention I hereunto set my hand in the presence of two subscribing witnesses.

PRATT A. SPICER.

Witnesses:
ELIAS HEWITT,
GEORGE COLEMAN.